(12) United States Patent
Miyazawa

(10) Patent No.: US 6,538,976 B1
(45) Date of Patent: Mar. 25, 2003

(54) OPTICAL SPOT GENERATION DEVICE FOR RECORDING MEDIUM

(75) Inventor: Hiroshi Miyazawa, Tokorozawa (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/486,040
(22) PCT Filed: Aug. 5, 1998
(86) PCT No.: PCT/JP98/03486
§ 371 (c)(1), (2), (4) Date: Feb. 18, 2000
(87) PCT Pub. No.: WO99/09553
PCT Pub. Date: Feb. 25, 1999

(51) Int. Cl.[7] .................................. G11B 7/00
(52) U.S. Cl. .................................. 369/112.23
(58) Field of Search .................. 369/44.23, 44.37, 369/44.38, 112.23, 112.24

(56) References Cited

U.S. PATENT DOCUMENTS 4,823,334 A * 4/1989 Tanaka et al. ............... 359/641
4,823,335 A * 4/1989 Shikama et al. ........ 369/112.09
5,095,476 A 3/1992 Greve et al.

FOREIGN PATENT DOCUMENTS

EP 0 339722 * 11/1989

OTHER PUBLICATIONS

Full Translation of Chinese Office Action dated Jun. 21, 2002.

* cited by examiner

Primary Examiner—Thang V. Tran
Assistant Examiner—Kim Lien Le
(74) Attorney, Agent, or Firm—Eric J. Robinson; Robinson Intellectual Property Law Office, P.C.

(57) ABSTRACT

The size of a collimator lens is reduced to make compact an optical pickup device. The collimator lens has a size which allows an object lens to receive collimated light on the whole surface thereof. Although the objective lens is displaced in a radial direction R (perpendicular to a track) by track servo control, it is not displaced in a tangential direction T (track direction). Therefore, the length of the collimator lens in the tangential direction T can be made shorter than that in the radial direction R.

6 Claims, 2 Drawing Sheets

OPTICAL SPOT GENERATION DEVICE FOR RECORDING MEDIUM

BACKGROUND OF THE INVENTION

1. Field of the Invention

The present invention relates to an optical spot generation device for writing and reading data to and from a recording medium such as an optical disc and an optical card, and more particularly to an optical spot generation device for a recording medium capable of being made compact.

2. Description of the Related Art

With an optical spot generation device for writing and reading data to and from a recording medium such as an optical disc and an optical card, collimated light is formed by a collimator lens and passed through an objective lens to apply an optical spot on a target track of a recording medium. In order to apply an optical spot on a target track of a recording medium, the objective lens is controlled through tracking serve to move it in a direction perpendicular to the track.

The collimator lens has a size which allows the objective lens to receive the collimated light on the whole surface of the objective lens, irrespective of the position of the objective lens in its motion range. From this reason, a conventional collimator lens is circular.

Since a conventional collimator lens is circular, its diameter is set so that the objective lens can receive the collimated light from the collimator lens on the whole surface of the objective lens, irrespective of the position of the objective lens in its motion range along the direction perpendicular to the track.

SUMMARY OF THE INVENTION

It is an object of the present invention to provide an optical spot generation device for a recording medium capable of being made compact.

According to an optical spot generation device for a recording medium of this invention, a light converging optical element receives light from a collimator and forms an optical spot on a track of the recording medium, the optical spot being displaced in a direction perpendicular to the track during tracking servo. In the optical spot generation device for a recording medium, the collimator has a size which allows the light converging optical element to receive collimated light from the collimator on a whole surface of the light converging optical element, irrespective of a position of the light converging optical element in its motion range. A length of the collimator in a track direction is cut shorter than a length in the direction perpendicular to the track, by an amount corresponding to that the light converging optical element is displaced in the direction perpendicular to the track and is not displaced in the track direction.

The collimator may be a collimator lens, an aspheric press lens, a lens with its aspheric surface being formed with a replica, a lens having a refractivity distribution in an optical axis direction, a lens with a refractivity distribution in a radial direction, a lens made of glass spherically polished lenses having different refractivities and attached together, and a lens made of a Fresnel zone plate.

This optical spot generation device is applied not only to a read only optical pickup device but also to a read/write optical spot generation device and a write only optical spot generation device. In writing data to a recording medium, the power of a laser output is made lager than in reading data from the recording medium. A light beam applied from the collimator to the light converging optical element is not limited only to one beam, but two or more beams may be used. The spot (M, E, F, G, H, I, J) on a recording medium may be a single spot or a plurality of spots.

The length of the collimator in the track direction can be made shorter than that in the direction perpendicular to the track, by an amount corresponding to that the objective lens is not displaced in the track lens.

In the optical spot generation device for a recording medium of this invention, a mirror is provided for changing an optical axis direction of an output optical axis thereof by 90° from an input optical axis thereof, wherein the collimator is disposed between the mirror and the light converging optical element on the output optical axis, a side of the cut portion of the collimator abuts on a surface of the mirror, and the collimator is mounted partially superposed upon the mirror along the optical axis direction.

The collimator with its opposite ends being cut along the track direction has its side of the cut portion being abutted on the surface of the mirror and the collimator is mounted partially superposed upon the mirror along the output optical axis direction. Accordingly, the length in the output optical axis of the optical spot generation device for a recording medium can be shortened.

In the optical spot generation device for a recording medium of this invention, a mirror is provided for changing an optical axis direction of an output optical axis thereof by 90° from an input optical axis thereof, wherein the collimator is disposed on the input optical axis, with the track direction of the collimator being set in parallel to direction of the output optical axis.

The collimator is disposed on the input optical axis, with the track direction or shorter length direction thereof being set in parallel to the direction of the output optical axis. Accordingly, the height of the optical spot generation device in the region of the input optical axis of the mirror can be lowered.

DETAILED DESCRIPTION OF THE PREFERRED EMBODIMENTS

Embodiments of the invention will be described with reference to the accompanying drawings.

Figure 1:
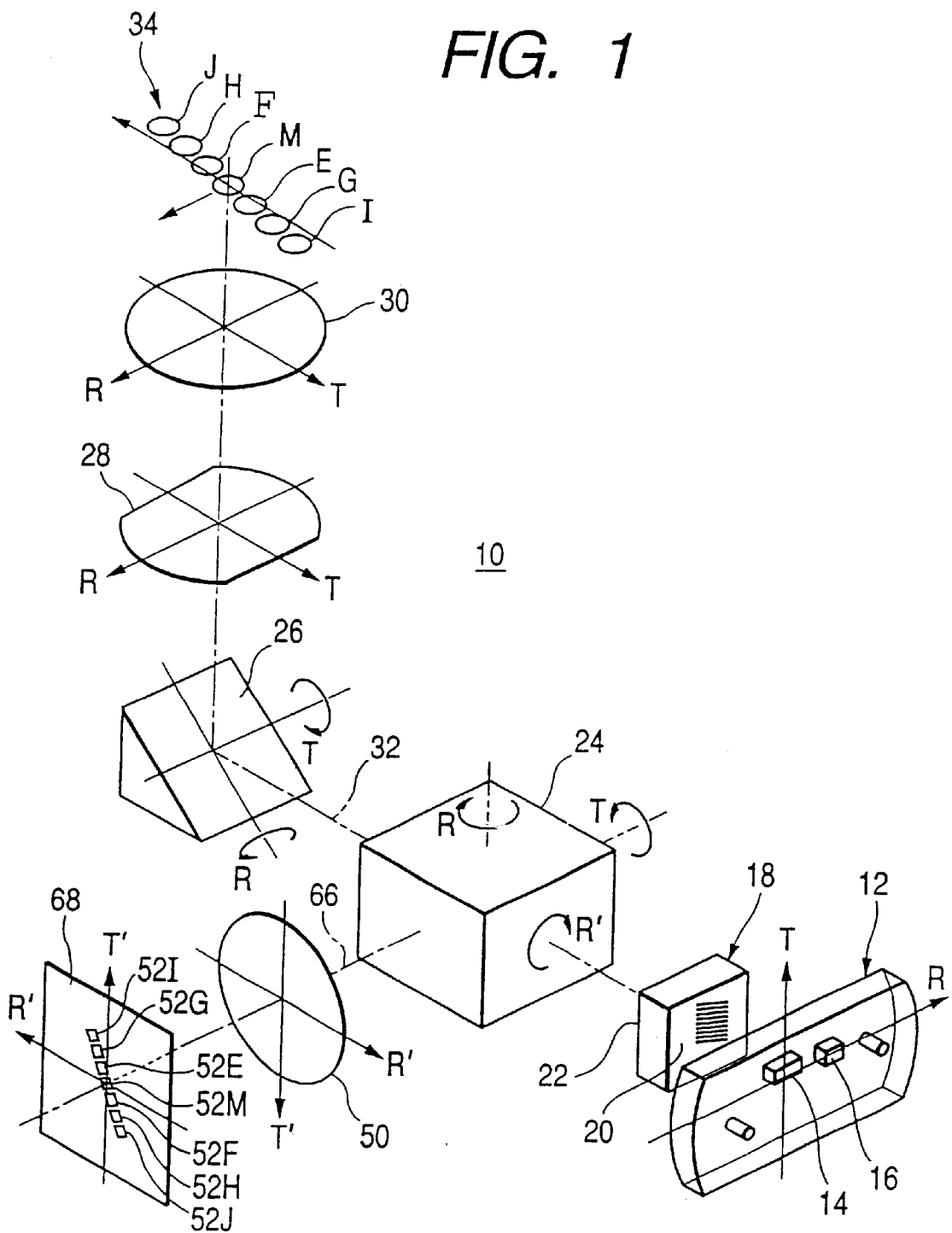
FIG. 1 is a schematic diagram showing optical paths of an optical pickup device.
Figure 2:
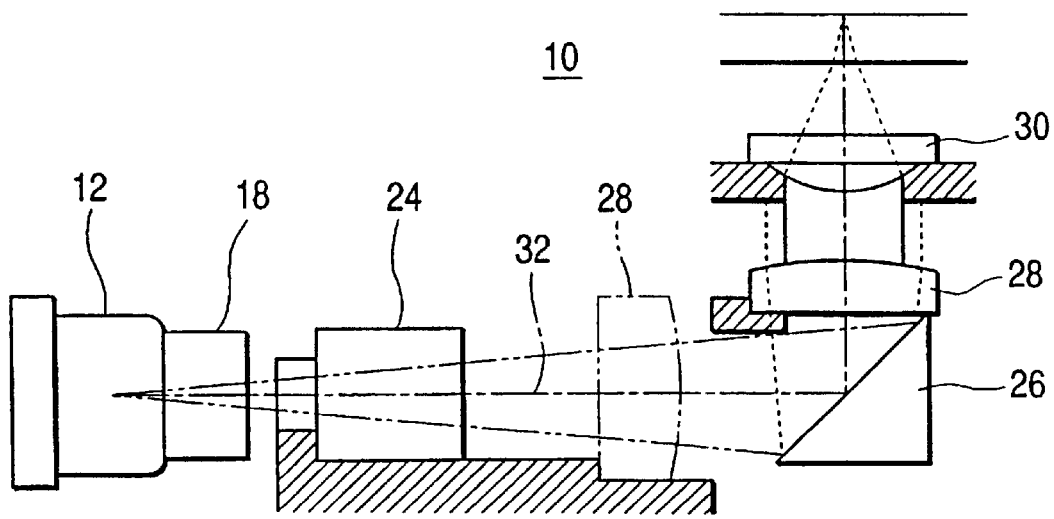
FIG. 2 is a cross sectional side view of the optical pickup device.

FIG. 1 is a schematic diagram showing optical paths of an optical pickup device. FIG. 2 is a cross sectional side view of the optical pickup device. In FIG. 1, an arrow R represents a radial (R) direction of an optical disc 34, and an arrow T represents a tangential (T) direction of a track of the optical disc 34. The R direction is a direction from the center of the optical disk 34 toward its outer periphery, and the anti-R direction is a direction from the outer periphery toward the center of the optical disc 34. The R and T directions given for each optical component correspond to motion directions of the component when a spot on the optical disc 34 is moved in the R and T directions on the optical disc 34. R' and T' directions given for a photodiode light reception surface 68 correspond to the R and T directions on the optical disc 34. R' and T' directions given for a beam splitter 24 and a focussing lens 50 correspond to motion directions thereof when a reflected light spot is moved in the R' and T' directions on the photodiode light reception surface 68.

Referring to FIGS. 1 and 2, a semiconductor laser 12 has a light emission unit 14 at the start of an optical axis 32 from the semiconductor laser 12 to the optical disc 34, and a photodiode 16 at a position displaced from the optical axis by a predetermined amount in the R direction. A hologram module 18 has a diffraction grating surface 20 on the semiconductor laser 12 side and a hologram surface 22 on the opposite side. A laser beam radiated from the light emission unit 14 is divided into seven light beams by the diffraction grading surface 20 of the hologram module 18, one beam on the optical axis 32 and three beams on opposite sides thereof. The seven beams propagate straight through the beam splitter 24, are deflected by 90° by a mirror 26, pass through a collimator lens 28 (indicated by a solid line in FIG. 2) and then through an objective lens 30 (light converging optical element) to form spots M, E, F, G, H, I, and J in line generally along the T direction on the optical disc 34 such as a CD. The spots M, E, F, G, H, I, and J are disposed symmetrically relative to the center of the optical disc 34. Namely, relative to the spot M on the optical axis 32, the spots E and F, spots G and H, and spots I and J are symmetrical. As will be later described, reflection light of the spot M is incident upon a photodiode 52M. Only this photodiode 52M is constituted of four photodiodes 52A, 52B, 52C, and 52D(not illustrated). The seven spots are applied to seven tracks consecutively disposed in the R direction. The collimator lens 28 is not circular, but is generally oval with opposite sides in the T direction being cut straight. This shape will be later described.

An optical axis 66 of reflection light of the spots M, E, F, G, H, I, and J is the same as the optical axis from the spot M to the beam splitter 24. Reflection light from the optical disc 34 is applied via the objective lens 30, collimator lens 28, and mirror 26 to the beam splitter 24 at which the direction of the reflection light is changed by 90° to be directed to the focussing lens 50. The photodiode light reception surface 68 has photodiodes 52M, 52E, 52F, 52G, 52H, 52I, and 52J disposed in line at a predetermined pitch in a direction perpendicular to the optical axis 66. The reflection light output from the beam splitter 24 passes through the focussing lens 50 and is incident upon the photodiodes 52M, 52E, 52F, 52G, 52H, 52I, and 52J. Only the photodiode 52M on the optical axis 66 is constituted of four photodiodes 52A, 52B, 52C, and 52D, two photodiodes being disposed in the R' and T' directions. Reflection light of the spot M is divisionally applied to the four photodiodes 52A, 52B, 52C, and 52D. Reflection light applied to the four photodiodes is used not only for reading data on the track of the optical disc but also for a tracking serve error signal of a DPD method.

A portion of the reflection light of the spot M applied to the beam splitter 24 is directed to the hologram module 18, and its direction is changed by the hologram surface 2 toward the photodiode 16. The reflection light incident upon the photodiode 16 is used as a focus serve control error signal. In accordance with this error signal, the objective lens 30 is displaced along the optical axis 32 direction to set the distance between the objective lens 30 and optical disc 34 to a proper value.

The oscillation frequency of the semiconductor laser 12 and the grating distance of the diffraction grating are subjected to manufacture variation. A ratio of the focal length of the collimator lens 28 to the total focal length of the collimator lens 28 and focussing lens 50 is also subjected to manufacture variation. These manufacture variations affect the pitch between reflection light beams on the photodiode light reception surface 68 which beams may become improperly incident upon the photodiodes 52E, 52F, 52G, 52H, 52I, and 52J, excepting the photodiode 52M. During the manufacture of the optical pickup device 10, the focussing lens 50 and photodiode light reception surface 68 are fixed to the positions along the optical axis so that the reflection light beams become correctly incident upon the photodiodes 52M, 52E, 52F, 52G, 52H, 52I, and 52J.

Figure 3:
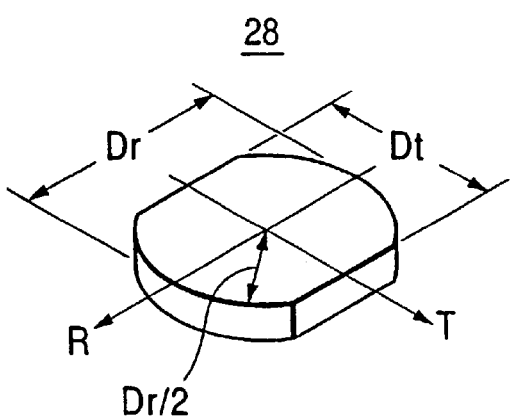
FIG. 3 is a perspective view of a collimator lens.

FIG. 3 is a perspective view of the collimator lens 28. The size of the collimator lens 28 is determined so that the objective lens 30 (FIGS. 1 and 2) can receive the collimated light from the collimator lens 28 on the whole surface of the objective lens, irrespective of the position of the objective lens in its motion range. Although the objective lens 30 is displaced in the R direction for tracking control, it is moved only a little in the T direction. Therefore, although the collimator lens 28 is required to have a size sufficient for the displacement of the objective lens 30 in the R direction, even if the opposite ends of the collimator lens 28 in the T direction can be cut by an amount corresponding to the displacement of the objective lens 30 in the T direction, the light can be incident upon the whole surface of the objective lens 30. Assuming that the effective light flux diameter of the objective lens 30 is 4 mm, that the tracking motion on one side of the objective lens 30 is 0.5 mm, and that the outer margin of the collimator lens 28 is 0.3 mm, then the length Dr of the collimator lens 28 in the R direction necessary for the objective lens 30 at an optional position to receive the collimated light, is:

$$Dr=4+0.5+0.5+0.3+0.3=5.6 \text{ mm}$$

In contrast, the length Dt of the collimator lens 20 in the T direction necessary for the objective lens 30 in the whole area in the track direction to receive the collimated light, is:

$$Dt=4+0.3+0.3=4.6 \text{ mm}$$

A conventional collimator lens is circular having a diameter of 5.6 mm, whereas the collimator 28 of this embodiment has the length Dt of 4.6 mm in the T direction shorter than the conventional lens by 17%, although the length Dr of 5.6 mm in the R direction is the same as the conventional lens. The shape of the collimator lens 28 is therefore oval with its opposite ends in the track direction being cut straight. The T direction of the collimator lens 28 is coincident with the direction of the optical axis 32 in the first half from the light emission unit 14 to the mirror 26 (a longitudinal direction of the optical pickup device 10). Therefore, by cutting the opposite ends of the collimator lens 28 in the T direction, the length of the optical pickup device 10 can be shortened.

In the example shown in FIGS. 1 and 2, the collimator lens 28 (indicated by the solid line) is disposed between the mirror 26 and objective lens 30. As indicated by a phantom line in FIG. 2, the collimator lens 28 may be disposed between the beam splitter 24 and mirror 26. In this case, the T direction of the collimator lens 28 along which the opposite ends are cut is coincident with a height direction of the optical pickup device 10. If the collimator lens 28 is mounted not between the mirror 26 and objective lens 30 but between the beam splitter 24 and mirror 26, the height of the optical pickup device 10 can be lowered. Since the T direction or smaller length direction of the collimator lens 18 mounted between the beam splitter 24 and mirror 26 is coincident with the height direction of the optical pickup device 10, the region from the semiconductor laser 12 to the collimator lens 28 can be prevented from being made high.

Figure 4:
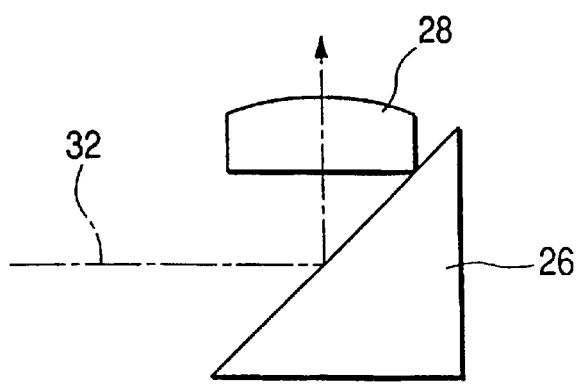
FIG. 4 is a diagram showing another example of a mount of the collimator lens.

FIG. 4 shows another example of a mount of the collimator lens 28. The collimator lens 28 is mounted partially lower than the height of the mirror 26 along the height direction of the optical pickup device 10. The side of the cut portion of the collimator lens 28 is abut on the slanted surface of the mirror 26 so that the height of the optical pickup device 10 can be made lower.

What is claimed is:

1. An optical spot generation device (10) for a recording medium (34) having a light converging optical element (30) which receives light from a collimator (28) and forms an optical spot (M, E, F, G, H, I, J) on a track of the recording medium, and which can be displaced in a direction perpendicular to the track, wherein said collimator has a size which allows said light converging optical element to receive collimated light from said collimator in a whole motion range of said light converging optical element (30) and a length of said collimator in a track direction is shorter than a length in the direction perpendicular to the track, and wherein said collimator has a lateral cross sectional shape of oval, with its opposite ends in the track direction being cut straight.

2. An optical spot generation device for a recording medium according to claim 1, further comprising a reflection optical element (26) for changing an optical axis (32) direction by 90°, wherein said collimator (28) is disposed between said reflection optical element (26) and said light converging optical element (30).

3. An optical spot generation device according to claim 1, further comprising a reflection optical element (26) for changing an optical axis (32) direction by 90° and a beam splitter (24), wherein said collimator is disposed between the beam splitter and the reflection optical element.

4. An optical spot generation device according to claim 1, wherein said collimator is any one of a collimator lens, an aspheric press lens, a lens with its aspheric surface being formed with a replaica, a lens having a refractivity distribution in an optical axis direction, a lens with a refractivity distribution in a radial direction, a lens made of glass spherically polished lenses having different refractivities and attached together, and a lens made of a Fresnel zone plate.

5. An optical spot generation device according to claim 1, wherein the vertical cross sectional shape of the collimator has a plane at a surface to which light passing through the collimator is input and a sphere to which the light is output.

6. An optical spot generation device (10) for a recording medium (34) having a light converging optical element (30) which receives light from a collimator (28) and forms an optical spot (M, E, F, G, H, I, J) on a track of the recording medium, and which can be displaced in a direction perpendicular to the track, wherein said collimator has a size which allows said light converging optical element to receive collimated light from said collimator in a whole motion range of said light converging optical element (30) and a length of said collimator in a track direction is shorter than a length in the direction perpendicular to the track, and wherein the collimator is fixed at a portion of a plane of the collimator and at least one portion of a side of the collimator to said generation device.

* * * * *

UNITED STATES PATENT AND TRADEMARK OFFICE
CERTIFICATE OF CORRECTION

PATENT NO.      : 6,538,976 B1
DATED           : March 25, 2003
INVENTOR(S)     : Hiroshi Miyazawa It is certified that error appears in the above-identified patent and that said Letters Patent is hereby corrected as shown below:

<u>Title page,</u>
Please insert Item: -- [30]  Foreign Application Priority Data
August 19, 1997 [JP] Japan 09-236476 --

Signed and Sealed this

Nineteenth Day of August, 2003

JAMES E. ROGAN
*Director of the United States Patent and Trademark Office*